United States Patent
Erickson

(10) Patent No.: US 8,072,324 B2
(45) Date of Patent: Dec. 6, 2011

(54) METHODS FOR REMOTE DEVICE STATUS DETERMINATION

(75) Inventor: David Lee Erickson, San Jose, CA (US)

(73) Assignee: iControl, Inc., Santa Clara, CA (US)

( * ) Notice: Subject to any disclaimer, the term of this patent is extended or adjusted under 35 U.S.C. 154(b) by 343 days.

(21) Appl. No.: 12/390,386

(22) Filed: Feb. 20, 2009

(65) Prior Publication Data

US 2009/0207017 A1    Aug. 20, 2009

Related U.S. Application Data

(60) Provisional application No. 61/029,925, filed on Feb. 20, 2008.

(51) Int. Cl.
*G08B 21/00* (2006.01)

(52) U.S. Cl. .................. 340/540; 340/539.26; 340/521; 340/568.1

(58) Field of Classification Search .................. 340/540, 340/541, 539.13, 539.26, 517, 521, 568.1, 340/508, 573.1, 539.14, 539.1, 522; 705/22
See application file for complete search history.

(56) References Cited

U.S. PATENT DOCUMENTS

| 5,917,433 | A  | * | 6/1999 | Keillor et al. | 340/989 |
| 7,212,955 | B2 | * | 5/2007 | Kirshenbaum et al. | 702/187 |
| 7,609,159 | B2 | * | 10/2009 | Benson et al. | 340/540 |
| 2005/0165588 | A1 | | 7/2005 | Iwan et al. | |
| 2006/0217115 | A1 | | 9/2006 | Cassett et al. | |

FOREIGN PATENT DOCUMENTS

| KR | 1020040049335 | 6/2004 |
| WO | 2005/114671 | 12/2005 |

* cited by examiner

*Primary Examiner* — Anh V La
(74) *Attorney, Agent, or Firm* — Martine Penilla Group, LLP

(57) ABSTRACT

Monitoring data is received from a remote device and represents a current status value of a monitored condition at the remote device. The monitored condition is characterized by a current state that can be any one of a number of possible states. A determination is made as to whether the current status value of the monitored condition as indicated by the received data satisfies a hysteresis criterion associated with the current state of the monitored condition. If the current status value of the monitored condition satisfies the hysteresis criterion, then a determination is made as to whether the hysteresis criterion has been continuously satisfied for a specified persistence period. If the hysteresis criterion has been continuously satisfied for the specified persistence period, then the current state of the monitored condition is changed to reflect the current status value of the monitored condition, and the changed current state is recorded.

18 Claims, 11 Drawing Sheets

| $T_1$ | $D_{1,1}$ | $D_{2,1}$ | $D_{3,1}$ | ... | $D_{i,1}$ |
|---|---|---|---|---|---|
| $T_2$ | $D_{1,2}$ | $D_{2,2}$ | $D_{3,2}$ | ... | $D_{i,2}$ |
| $T_3$ | $D_{1,3}$ | $D_{2,3}$ | $D_{3,3}$ | ... | $D_{i,3}$ |
| ... | ... | ... | ... | ... | ... |
| $T_j$ | $D_{1,j}$ | $D_{2,j}$ | $D_{3,j}$ | ... | $D_{i,j}$ |

Fig. 3C

```
L1..For each table altered by arriving data
L2.....For each status/alarm defined by table
L3........Fetch status/alarm definition
L4...........field, condition, threshold, hysteresis, persist
L5........Fetch most-recent scanned date-time, status/alarm state
L6........Define change-of-state
L7...........If most-recent status/alarm = false
L8..............then "field condition threshold"
L9...........If most-recent status/alarm = true
L10.............then "field anti-condition threshold ± hysteresis"
L11.........Search next change-of-state
L12............after most-recent scanned date-time
L13.........If found
L14............If persist > 0
L15...............Define return-change-of-state
L16..................If most-recent status/alarm = false
L17.....................then "field anti-condition threshold"
L18..................If most-recent status/alarm = true
L19.....................then "field condition threshold ± hysteresis"
L20...............Search same change-of-state after next change-of-state date-time + persist
L21...............If found
L22..................Search (last) return-change-of-state
L23.....................after next change-of-state date-time and
L24.....................before same change-of-state date-time
L25..................If found
L26.....................Set most-recent scanned date-time to (last) return-change-of-state date-time
L27..................Else
L28.....................Set most-recent scanned date-time to same change-of-state date-time
L29.....................Set most-recent state/alarm state to new value
L30............Else
L31...............Search return-change-of-state
L32..................after next change-of-state date-time
L33...............If found
L34..................Set most-recent scanned date-time to return-change-of-state date-time
L35............Else
L36...............Set most-recent scanned date-time to next change-of-state date-time
L37...............Set most-recent state/alarm state to next state
```

Fig. 4

```
L1       Select
             @Table_   := 'Data_8_0_0_0_27_173_0_64_12',
             @TableSpec := 'iDAC/8-0-0-0/27-173-0/64/12',
             @AlarmDef := 0;

L2-L4    Select
             @Field := Field As Field,
             @Condition_ := Condition_ As Condition_,
             @Threshold := Threshold As Threshold,
             @Hysteresis := Hysteresis As Hysteresis,
             @Persistence := Period As Persistence
         From Condition_ Where Path Like @TableSpec Limit @AlarmDef, 1;

Select
             @Anticondition :=
                 If(Condition_ = '<',  '>='),
                 If(Condition_ = '<=', '>' ),
                 If(Condition_ = '=',  '<>'),
                 If(Condition_ = '>=', '<' ),
                 If(Condition_ = '>',  '<=', '=')))))
             As Anticondition;

Select
             @HysteresisOperator :=
                 If(Condition_ = '<',  '+'),
                 If(Condition_ = '<=', '+'),
                 If(Condition_ = '=',  '+'),
                 If(Condition_ = '>=', '-'),
                 If(Condition_ = '>',  '-', '+')))))
             As HysteresisOperator;
```

Fig. 5A

```
L5      Select
            @MostRecentTime := PostTime As MostRecentTime,
            @Identity := Identity,
            @MostRecentState := If(Identity = 'Status', Value, Alarm)
                As MostRecentState
        From Alarm Where Path Like @TableSpec Limit 1;

Select
L6          @ChangeState := If(@MostRecentState,
L9-L10          Concat(@Field, @Anticondition, '(', @Threshold, @HysteresisOperator, @Hysteresis, ')'),
L7-L8           Concat(@Field, @Condition_, @Threshold)) As ChangeState,
L15         @ReturnState := If(@MostRecentState,
L18-L19         Concat(@Field, @Condition_, '(', @Threshold, @HysteresisOperator, @Hysteresis, ')'),
L16-L17         Concat(@Field, @Anticondition, @Threshold)) As ReturnState;

Select @NextState := 0, @NextChangeStateTime := '',
            @SameChangeStateTime := '', @LastChangeStateTime := '',
            @ReturnStateTime := '';

Select
L11         @NextChangeStateTime := Source_Time As NextChangeStateTime,
            @NextState := If(Identity = 'Status',
                If(@Field > 0, '', @Field),
                If (Alarm > 0, '', (@Alarm)))
                As NextState
```

Fig. 5B

```
       From @Table_
       Where
L6           @ChangeState And
L12          (Source_Time > @MostRecentTime)
       Order by Source_Time
       Limit 1;

Select
L20          @SameChangeStateTime := Source_Time As SameChangeStateTime,
       From @Table_
       Where
L6           @ChangeState And
L20          (Source_Time >= @NextChangeStateTime + @Persist) And
L13          (@NextChangeStateTime > '') And
L14          (@Persist > 0)
       Order by Source_Time
       Limit 1;

Select
L22          @LastReturnStateTime :=Source_Time As LastReturnStateTime,
       From @Table_
       Where
L18          @ReturnState And
L23          (Source_Time > @NextChangeStateTime) And
L24          (Source_Time < @SameChangeStateTime) And
L13          (@NextChangeStateTime > '') And
L14          (@Persist > 0) And
L21          (@SameChangeStateTime > '')
       Order by Source_Time Desc
       Limit 1;
```

Fig. 5C

```
L26    Update Alarm Set
           MostRecentTime = @LastChangeStateTime
       Where
L13        (Path = @Table) And
L14        (@NextChangeStateTime > '') And
L21        (@Persist > 0) And
L25        (@SameChangeStateTime > '') And
           (@LastReturnStateTime > '');

L28    Update Alarm Set
           MostRecentTime = @SameReturnStateTime,
L29        MostRecentState = If(@MostRecentState > 0, '', If(Identity = 'Status', @Field, 'Alarm'))
       Where
L13        (Path = @Table) And
L14        (@NextChangeStateTime > '') And
L21        (@Persist > 0) And
L27        (@SameChangeStateTime > '') And
           (@LastReturnStateTime = '');

L31    Select
           @ReturnStateTime := Source_Time As ReturnStateTime,
       From @Table
       Where
L18        ReturnState And
L32        (Source_Time > @NextChangeStateTime) And
L13        (@NextChangeStateTime > '') And
L14        (@Persist > 0) And
L21        (@SameChangeStateTime = '')
       Order by Source_Time
       Limit 1;
```

Fig. 5D

```
      Update Alarm Set
L34       MostRecentTime = @ReturnStateTime
       Where
L13       (Path = @Table) And
L14       (@NextChangeStateTime > '') And
          (@Persist > 0) And
          (@ReturnStateTime > '');

Update Alarm Set
L36       MostRecentTime = @NextChangeStateTime,
L37       MostRecentState = If(@MostRecentState > 0, '', If(Identity = 'Status', @Field, 'Alarm'))
       Where
L13       (Path = @Table) And
L14       (@NextChangeStateTime > '') And
          (@Persist = 0);
```

Fig. 5E

METHODS FOR REMOTE DEVICE STATUS DETERMINATION

CLAIM OF PRIORITY

This application claims priority under 35 U.S.C. 119(e) to U.S. Provisional Patent Application No. 61/029,925, filed Feb. 20, 2008, entitled "Sequencing for Alarm Determination." The disclosure of the above-identified provisional patent application is incorporated herein by reference.

BACKGROUND

An enterprise may include many geographically dispersed components. It may be of interest to monitor a number of conditions at various dispersed enterprise components. Moreover, the monitored conditions may represent actionable intelligence regarding the dispersed enterprise components. For example, a shipping company may deploy door status monitoring devices on thousands of shipping containers that travel throughout the world. An unauthorized access into a particular shipping container may represent a security breach that requires immediate response by authorities. By way of this example, it should be appreciated that a method is required to timely and accurately evaluate monitored status data received from remote components. Additionally, when the monitored status data is capable of initiating a resource-intensive response, it is beneficial to ensure that the monitored status data is evaluated so as to minimize erroneous conclusions such as false alarms.

SUMMARY

In one embodiment, a method is disclosed for remote device status determination based on real-time monitoring data reception. The method includes an operation for receiving a data signal in real-time from a remote device. The data signal represents a current status value of a monitored condition at the remote device. The monitored condition is characterized by a current state that can be any one of a number of possible states. The method also includes an operation for determining whether the current status value of the monitored condition, as indicated by the received data signal, satisfies a hysteresis criterion associated with the current state of the monitored condition. If the current status value of the monitored condition satisfies the hysteresis criterion, then an operation is performed to determine whether the hysteresis criterion has been continuously satisfied for a specified persistence period. If the hysteresis criterion has been continuously satisfied for the specified persistence period, then an operation is performed to change the current state of the monitored condition to reflect the current status value of the monitored condition. The method further includes an operation for conveying the current state of the monitored condition to a responsible entity.

In another embodiment, a method is disclosed for device status determination based on recorded monitoring data reception. The method includes an operation for receiving a set of monitoring data records from a remote device. Each monitoring data record includes a status value of a monitored condition recorded at a particular time at the remote device. At any given time, the monitored condition is characterized by any one of a number of possible states. The method also includes an operation for storing the received set of monitoring data records in a database. The method also includes an operation for sorting the monitoring data records in the database in chronological order. The method further includes an operation for processing the monitoring data records in the database in chronological order proceeding forward in time from a previous instance of known state of the monitored condition. Each data record is processed to identify and record changes in the monitored condition over time that satisfy a hysteresis criterion and a persistence criterion.

Other aspects and advantages of the invention will become more apparent from the following detailed description, taken in conjunction with the accompanying drawings, illustrating by way of example the present invention.

BRIEF DESCRIPTION OF THE DRAWINGS

FIG. 3C shows a generalized database layout for storing the received monitoring data records, in accordance with one embodiment of the present invention;

FIG. 4 shows a pseudo code representation of an algorithm that can be performed on the database of received monitoring data records to identify and record changes in monitored conditions over time, in accordance with one embodiment of the present invention; and FIGS. 5A-5E show a Structure Query Language (SQL) script defined to implement the pseudo code of FIG. 4 within a database of received monitoring data records, in accordance with one embodiment of the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
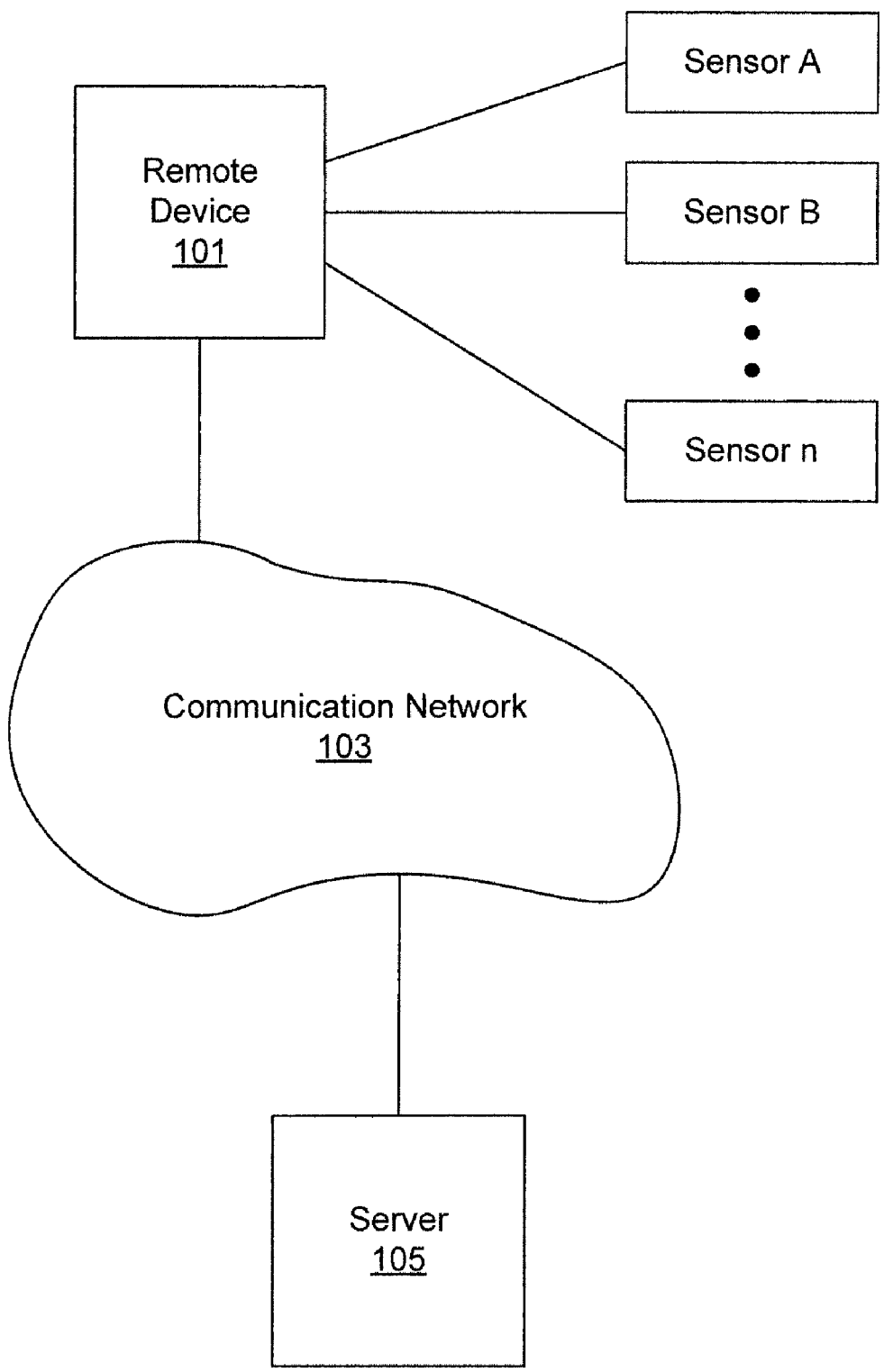
FIG. 1 shows a system in which a remote device is defined to communicate with a server computing system so as to transmit monitoring data to the server, in accordance with one embodiment of the present invention.

FIG. 1 shows a system in which a remote device 101 is defined to communicate with a server computing system (server 105) so as to transmit monitoring data to the server 105, in accordance with one embodiment of the present invention. Communication between the remote device 101 and server 105 is enabled by a communication network 103. The communication network 103 can be either a wired network, a wireless network, or a combination of wired and wireless networks. The remote device 101 is defined to communicate with a number of sensors (Sensors A-n) at the remote device 101 to receive monitoring signals from the sensors. The communication between the remote device 101 and the sensors may be uni-directional or bi-directional, depending on the type of sensor.

The sensors (Sensors A-n) can be defined as essentially any type of sensor capable of monitoring a condition at the remote device 101 and communicating a signal representative of a current state of the condition to the remote device 101. In one embodiment, a given sensor can be defined to monitor a binomial condition which may trigger an alarm. For example, the sensor may be a contact switch deployed to monitor a condition of a door, i.e., open or closed, wherein opening of the door triggers an alarm. In another embodiment, a given sensor can be defined to monitor a graduated condition, thereby indicating any one of a number of levels of the graduated condition. For example, the sensor may be a thermometer deployed to measure a temperature within a particular area. The measured temperature represents a graduated condition that can be binned into any one of a number of designated temperature ranges.

It should be appreciated that accurate and timely processing of monitoring data received at the server 105 from the remote device 101 can be quite important in various embodiments, particularly when the received monitoring data may cause actuation of an alarm that requires response by an observing entity. Methods are described herein for accurate and timely processing of monitoring data received from a remote device. The methods described herein provide for minimum monitoring data latency while simultaneously improving data integrity and mitigating false alarms. Additionally, methods are described herein for processing both real-time monitoring data and recorded monitoring data.

Real-time monitoring data is processed immediately upon receipt. Recorded monitoring data is processed upon completion of the data transmission from the remote device 101 to the server 105. The recorded monitoring data may be received in arbitrary chronological order. In one embodiment, the recorded monitoring data is transmitted from the remote device 101 to the server 105 in reverse chronological order to ensure that in the event of transmission failure at least the most recent recorded data will be provided for processing at the server 105. Upon receipt at the server 105, the recorded monitoring data is stored, sorted by data source, sorted by data type, and sorted by chronological order. In one embodiment, the recorded data is stored in a database at the server and is processed by querying the database.

Figure 2:
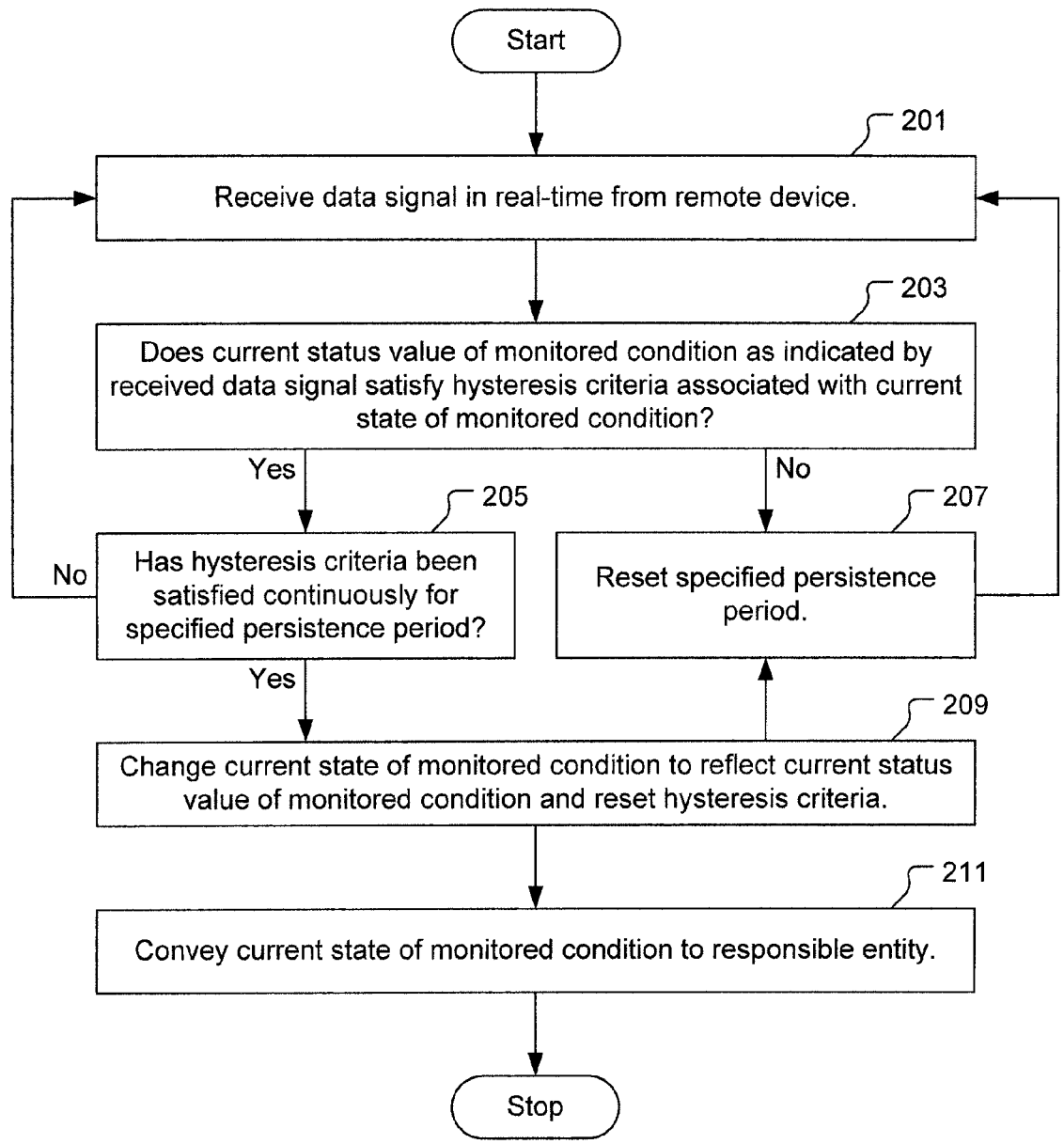
FIG. 2 shows a flowchart of a method for remote device status determination based on real-time monitoring data reception, in accordance with one embodiment of the present invention.

FIG. 2 shows a flowchart of a method for remote device status determination based on real-time monitoring data reception, in accordance with one embodiment of the present invention. The method includes an operation 201 for receiving a data signal in real-time from a remote device. The data signal represents a current status value of a monitored condition at the remote device. The monitored condition is characterized by a current state that can be any one of a number of possible states. For example, the monitored condition can be characterized by a current state that is either of two possible states, e.g., on/off, alarm/normal, open/closed, up/down, etc. In another example, the monitored condition can be characterized by a current state that is either of multiple possible states, e.g., normal/off-normal/alarm, low/medium/high, level-1/level-2/level-3/level-4, etc. In various embodiments, the monitored condition can be conveyed as either an analog or digital signal. The current state of the monitored condition represents the state of the monitored condition prior to receipt of the data signal. The current status value of the monitored condition as conveyed by the received data signal may be the same or different than the current state of the monitored condition.

The method continues with an operation 203 for determining whether the current status value of the monitored condition, as indicated by the received data signal, satisfies a hysteresis criterion associated with the current state of the monitored condition. The hysteresis criterion is defined to ensure that changes in the current status value of the monitored condition represent "actual" changes beyond what would be considered transient or noise fluctuations. Hysteresis criterion ensures that declaration of a change of state of the monitored conditions requires a change in the status value of a monitored condition of at least a minimum threshold amount. The hysteresis criterion to be applied at a given time can be dependent upon the current state of the monitored condition.

For example, the hysteresis criterion applied when the monitored condition is in a normal state may specify a relatively large minimum threshold amount of change in the status value in order to transition from the normal state to the alarm state. Further, the hysteresis criterion applied when the monitored condition is in an alarm state may specify a lower minimum threshold amount of change in the status value in order to transition from the alarm state back to the normal state. Also, it should be understood that the changes in the status value of the monitored condition may be positive or negative. Therefore, the hysteresis criterion may be correspondingly applied in either a positive direction or negative direction, depending on the current state of the monitored condition.

In one embodiment, the number of possible states of the monitored condition includes a normal state and an alarm state. In this embodiment, a first hysteresis criterion is applied when the monitored condition is in the normal state. This first hysteresis criterion represents a minimum threshold of change in the current status value necessary to warrant changing the monitored condition from the normal state to the alarm state. Also in this embodiment, a second hysteresis criterion is applied when the monitored condition is in the alarm state. This second hysteresis criterion represents a minimum threshold of change in the current status value necessary to warrant changing the monitored condition from the alarm state to the normal state.

If operation 203 determines that the current status value of the monitored condition satisfies the hysteresis criterion, then an operation 205 is performed to determine whether the hysteresis criterion has been continuously satisfied for a specified persistence period. In one embodiment, the specified persistence period is defined as a duration of time. In another embodiment, the specified persistence period is defined as a number of received data signals. The specified persistence period is defined to reject intermittent or spurious changes in status value of the monitored condition, thereby minimizing false alarms due to noise in the sampled status value of the monitored condition.

If the hysteresis criterion has not been continuously satisfied for the specified persistence period, the method reverts back to operation 201 to receive another data signal for processing. If the hysteresis criterion has been continuously satisfied for the specified persistence period, the method proceeds with an operation 209.

If operation 203 determines that the current status value of the monitored condition does not satisfy the hysteresis criterion, then an operation 207 is performed to reset the specified persistence period. It should be understood that resetting of the specified persistence period in operation 203 does not change the hysteresis criterion that is currently applied. From operation 207, the method reverts back to operation 201 to receive another data signal for processing.

In operation 209, the current state of the monitored condition is changed to reflect the current status value of the monitored condition. Also, in operation 209, the hysteresis criterion is reset to the hysteresis criterion associated with the new current state of the monitored condition. From operation 209, the method proceeds with both operations 207 and 211. As discussed above, in operation 207, the specified persistence period is reset. Then, the method reverts back to operation 201. In operation 211, the current state of the monitored condition is conveyed to a responsible entity. For example, if the current state of the monitored condition is an alarm state, operation 211 may cause an alarm communication to be transmitted. It should be understood that the method of FIG. 2 is performed immediately upon receipt of the data signal.

The method of FIG. 2 is applicable to processing of real-time monitoring data. By definition real-time data is received in chronological order. Upon receipt of any real-time monitoring data, the server 105 begins processing of the real-time monitoring data. The real-time monitoring data processing may include application of hysteresis and/or persistence criterion, as discussed above. Also, it should be understood that in one embodiment, the hysteresis criterion can be set to essentially remove any threshold change requirement, thereby effectively removing the hysteresis criterion. Also, in one embodiment, the persistence criterion can be set to essentially zero persistence period, thereby effectively removing the persistence criterion. A priority assigned by the server 105 for processing of the real-time monitoring data signal is intended to minimize latency between the arrival time and processing time of the real-time monitoring data at the server 105.

Figure 3A:
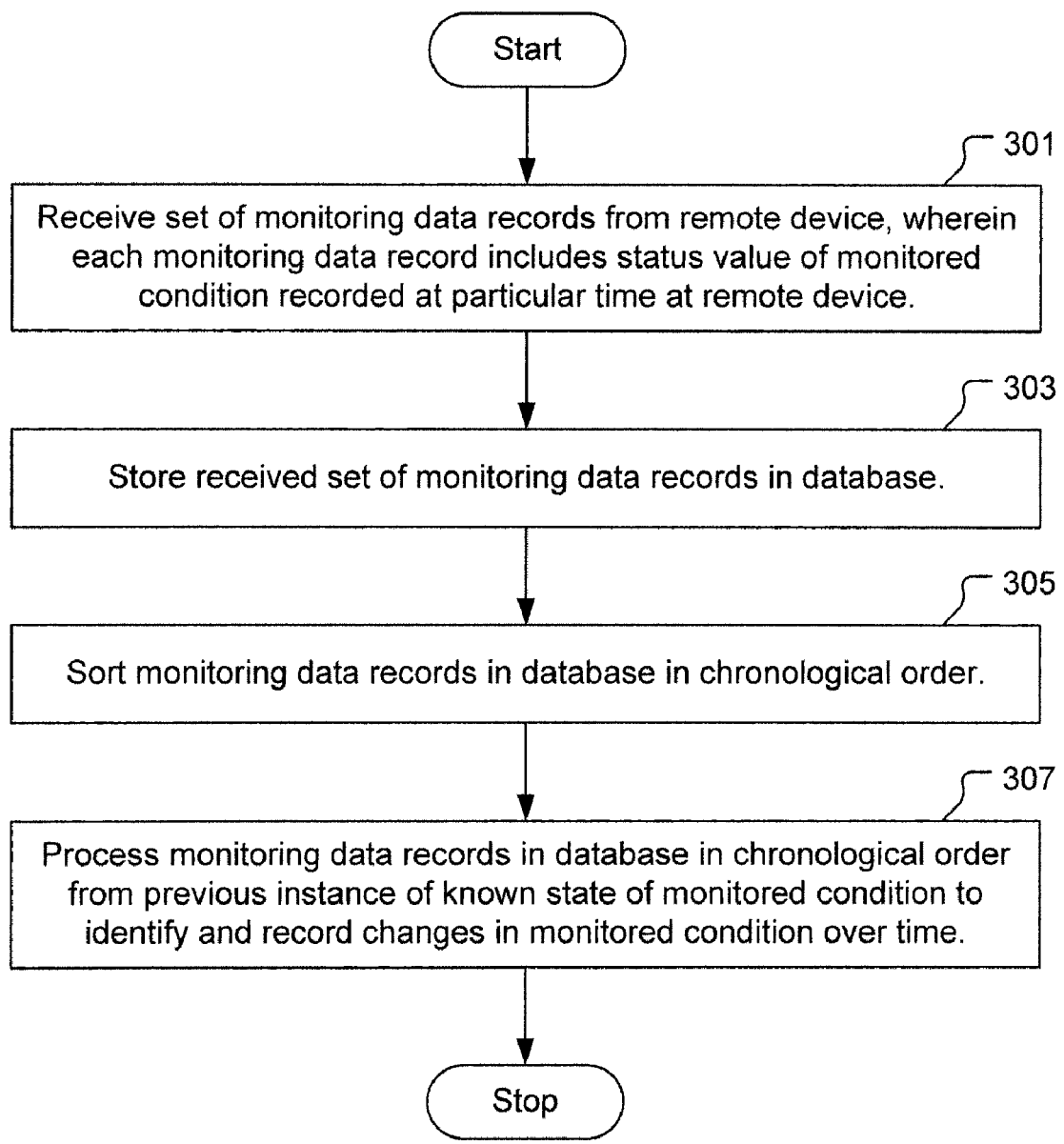
FIG. 3A shows a flowchart of a method for device status determination based on recorded monitoring data reception, in accordance with one embodiment of the present invention.

FIG. 3A shows a flowchart of a method for device status determination based on recorded monitoring data reception, in accordance with one embodiment of the present invention. An operation 301 is performed to receive a set of monitoring data records from a remote device. Each monitoring data record includes a status value of a monitored condition recorded at a particular time at the remote device. At any given time, the monitored condition is characterized by any one of a number of possible states.

In one embodiment, a mutually understood transmission completion signal is transmitted from the remote device to the server to indicate that all recorded monitoring data has been transmitted. Upon receipt of the transmission completion signal, the method proceeds with an operation 303 to begin processing the received recorded monitoring data. In another embodiment, the server assumes that the transmission of recorded monitoring data has been completed upon termination of the transmission, without explicit transmission of a completion signal. In this embodiment, upon termination of the transmission, the method proceeds with the operation 303 to begin processing the received recorded monitoring data.

In operation 303, the received set of monitoring data records is stored in a database. It should be understood that the monitoring data records can be received in an arbitrary chronological order. An operation 305 is then performed to sort the monitoring data records in the database so as to be in chronological order. FIG. 3C shows a generalized database layout for storing the received monitoring data records, in accordance with one embodiment of the present invention. Each received data record includes a number (i) of data measurements. More specifically, each received data record includes a measured status value for each of a number (i) of monitored conditions. Also, each received data record corresponds to a measurement time ($T_j$), where (j) represents the latest measurement time. The generalized database layout of FIG. 3C shows the monitoring data records sorted in chronological order ($T_1 \ldots T_j$) as a result of operation 305.

Figure 3B:
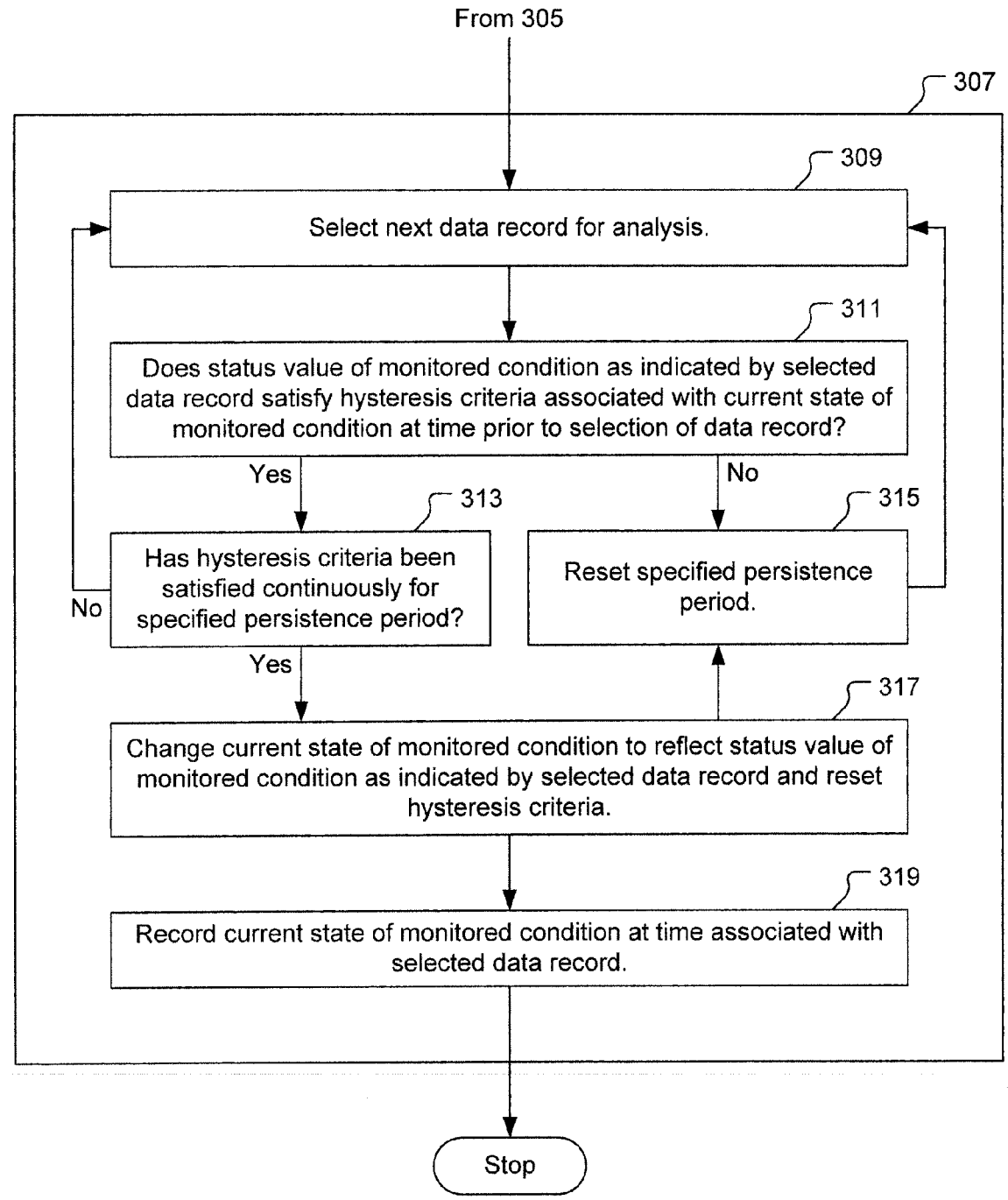
FIG. 3B shows an expanded view of operation 307 of FIG. 3A, in accordance with one embodiment of the present invention.

From operation 305, the method proceeds with an operation 307 to process the monitoring data records in the database in chronological order, i.e., forward in time, from a previous instance of known state of the monitored data condition, so as to identify and record changes in the monitored condition over time. FIG. 3B shows an expanded view of operation 307 of FIG. 3A, in accordance with one embodiment of the present invention. In FIG. 3B, proceeding from operation 305, an operation 309 is performed to select a next data record for analysis. It should be understood that data records in the database are selected for analysis in chronological order proceeding forward in time from a previous instance of known state of the monitored data condition. An operation 311 is then performed to determining whether the status value of the monitored condition, as indicated by the selected data record, satisfies a hysteresis criterion associated with the current state of the monitored condition at the time of selection of the data record. The hysteresis criterion is the same as that discussed above with regard to FIG. 2.

If operation 311 determines that the status value of the monitored condition as indicated by the selected data record satisfies the hysteresis criterion, then an operation 313 is performed to determine whether the hysteresis criterion has been continuously satisfied for a specified persistence period. The specified persistence period is the same as that discussed above with regard to FIG. 2. If the hysteresis criterion has not been continuously satisfied for the specified persistence period, the method reverts back to operation 309 to select the next data record for analysis. If the hysteresis criterion has been continuously satisfied for the specified persistence period, the method proceeds with an operation 317.

If operation 311 determines that the status value of the monitored condition as indicated by the selected data record does not satisfy the hysteresis criterion, then an operation 315 is performed to reset the specified persistence period. It should be understood that resetting of the specified persistence period in operation 315 does not change the hysteresis criterion that is currently applied, as the current state of the monitored condition has not changed. From operation 315, the method reverts back to operation 309 to select the next data record for analysis.

In operation 317, the current state of the monitored condition is changed to reflect the status value of the monitored condition as indicated by the selected data record. Also, in operation 317, the hysteresis criterion is reset to the hysteresis criterion associated with the new, i.e., changed, current state of the monitored condition. From operation 317, the method proceeds with both operations 315 and 319. As discussed above, in operation 315, the specified persistence period is reset. Then, the method reverts back to operation 309. In operation 319, the current state of the monitored condition is recorded at the time associated with the selected data record.

As discussed above with regard to FIG. 3C, monitoring data can be received from a remote device and stored in a database for monitored condition status processing. FIG. 4 shows a pseudo code representation of an algorithm that can be performed on the database of received monitoring data records to identify and record changes in monitored conditions over time, in accordance with one embodiment of the present invention. Each operation of FIG. 4 is assigned a numerical label (L1-L37). FIGS. 5A-5E show a Structure Query Language (SQL) script defined to implement the pseudo code of FIG. 4 within a database of received monitoring data records, in accordance with one embodiment of the present invention.

As shown in FIG. 4, for each table altered by arriving data, status/alarm processing specifications are collected. Data processing is invoked for each specification including field, condition, threshold, hysteresis and persistence. A current state and date-time for the field are retrieved, and the change-of-state expression is defined. Then a search is conducted for a first occurrence of the change-of-state after the current state's date-time. If found, then a persistence test may begin.

The persistence test defines a return-change-of-state expression, which is the inverse condition of the earlier change-of-state expression. The persistence test searches for a record with the same change-of-state condition after the earlier found change-of-state condition and with at least the specified persistence period as determined by a difference in sample date-time. If the later matching state is found, then a search is conducted between the earlier and later matching states for a return-change-of-state that violates the persistence test within the minimum persistence period. If a violation is discovered, the current state is not changed but the date-time for the current state is advanced to the violation date-time. If a violation is not discovered, the current state is updated to the new state and the current state date-time is advanced to the later record for the change-of-state. But if the later matching state was not found, then a search is conducted after the earlier state for a return-change-of-state that matches the current state. If a match is found, the current state is not changed but the date-time for the current state is advanced to the matching date-time.

If persistence is not specified, it is assumed to be zero and the persistence test is not performed. In this case, the current state is updated to the changed state, and the current state date-time is advanced to the later record for the next change-of-state.

FIGS. 5A-5E combine in an appended manner to form the SQL script defined to implement the pseudo code of FIG. 4. Starting with FIG. 5A, the table and alarm specification index are initialized to the first set. The specification is retrieved to define field, condition, threshold, hysteresis and persistence. The anti-condition and hysteresis operator are defined. Starting in FIG. 5B, the current (most-recent) status/alarm state and event time are loaded. The expressions defining change-of-state and return-change-of-state are assembled.

Starting in FIG. 5C, a series of variables are initialized that will store search results. The first search finds the next change-of-state and change-of-state time after the current (most-recent) event date-time. The second search finds a similar change-of-state following the earlier (next) event date-time and satisfying the persistence period, if an earlier change-of-state was identified. The third search finds a violation of the persistence period where the state returns to the original (current) state between the earlier and later change-of-state, if both change-of-state events were identified.

Starting in FIG. 5D, if all three prior searches (next change-of-state, same change-of-state, last return-change-of-state) are successful, then the persistence test was violated and the state is not changed, but the scan time is advanced to the violation date-time. If the persistence test was successful, there was no violation (last return-change-of-state was null) and the state and event date-time are updated.

Starting in FIG. 5E, if only a single change-of-state (next change-of-state) search was successful, a fourth search finds a return to the original state. If found, the state is not changed, but the scan time is advanced to the return change-of-state date-time. And, if persistence was not specified or zero, the state and event date-time are updated to the next change-of-state event.

It should be understood that the invention described herein can be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A method for remote device status determination based on real-time monitoring data reception, comprising:

operating a computer to receive a data signal in real-time from a remote device, wherein the data signal represents a current status value of a monitored condition at the remote device, wherein the monitored condition is characterized by a current state that can be any one of a number of possible states;

operating the computer to determine whether the current status value of the monitored condition as indicated by the received data signal satisfies a hysteresis criterion associated with the current state of the monitored condition;

if the current status value of the monitored condition satisfies the hysteresis criterion, then operating the computer to determine whether the hysteresis criterion has been continuously satisfied for a specified persistence period;

if the hysteresis criterion has been continuously satisfied for the specified persistence period, then operating the computer to change the current state of the monitored condition to reflect the current status value of the monitored condition; and conveying the current state of the monitored condition to a responsible entity.

2. The method as recited in claim 1, wherein the number of possible states of the monitored condition includes a normal state and an alarm state, wherein a first hysteresis criterion is applied when the monitored condition is in the normal state, the first hysteresis criterion representing a minimum threshold of change in the current status value necessary to warrant changing the monitored condition from the normal state to the alarm state, and wherein a second hysteresis criterion is applied when the monitored condition is in the alarm state, the second hysteresis criterion representing a minimum threshold of change in the current status value necessary to warrant changing the monitored condition from the alarm state to the normal state.

3. The method as recited in claim 1, wherein the specified persistence period is defined as a duration of time.

4. The method as recited in claim 1, wherein the specified persistence period is defined as a number of received data signals.

5. The method as recited in claim 1, wherein the method is performed immediately upon receipt of the data signal.

6. The method as recited in claim 1, further comprising:
if the current status value of the monitored condition does not satisfy the hysteresis criterion, then resetting the specified persistence period without changing the current state of the monitored condition.

7. The method as recited in claim 1, further comprising:
resetting the specified persistence period and the hysteresis criterion upon changing the current state of the monitored condition.

8. A method for device status determination based on recorded monitoring data reception, comprising:
operating a computer to receive a set of monitoring data records from a remote device, wherein each monitoring data record includes a status value of a monitored condition recorded at a particular time at the remote device, wherein at any given time the monitored condition is characterized by any one of a number of possible states;
operating the computer to store the received set of monitoring data records in a database;
operating the computer to sort the monitoring data records in the database in chronological order; and
operating the computer to process the monitoring data records in the database in chronological order proceeding forward in time from a previous instance of known state of the monitored condition, wherein each data record is processed by the computer to identify and record changes in the monitored condition over time that satisfy a hysteresis criterion and a persistence criterion.

9. The method as recited in claim 8, wherein processing the monitoring data records in the database includes:
selecting a next data record for analysis,
determining whether a status value of the monitored condition as indicated by the selected data record satisfies a hysteresis criterion associated with a current state of the monitored condition at a time of selection of the data record;
if the status value of the monitored condition as indicated by the selected data record satisfies the hysteresis criterion, then determining whether the hysteresis criterion has been continuously satisfied for a specified persistence period;
if the hysteresis criterion has been continuously satisfied for the specified persistence period, then changing the current state of the monitored condition to reflect the status value of the monitored condition as indicated by the selected data record; and
recording the current state of the monitored condition in accordance with a time associated with the selected data record.

10. The method as recited in claim 9, wherein processing the monitoring data records in the database further includes:
if the status value of the monitored condition as indicated by the selected data record does not satisfy the hysteresis criterion, then resetting the specified persistence period without changing the current state of the monitored condition.

11. The method as recited in claim 9, wherein processing the monitoring data records in the database further includes:
resetting the specified persistence period and the hysteresis criterion upon changing the current state of the monitored condition.

12. The method as recited in claim 9, wherein the number of possible states of the monitored condition includes a normal state and an alarm state,
wherein a first hysteresis criterion is applied when the monitored condition is in the normal state, the first hysteresis criterion representing a minimum threshold of change in the status value of the monitored condition as indicated by the selected data record necessary to warrant changing the monitored condition from the normal state to the alarm state, and
wherein a second hysteresis criterion is applied when the monitored condition is in the alarm state, the second hysteresis criterion representing a minimum threshold of change in the status value of the monitored condition as indicated by the selected data record necessary to warrant changing the monitored condition from the alarm state to the normal state.

13. The method as recited in claim 9, wherein the specified persistence period is defined as a duration of time.

14. The method as recited in claim 9, wherein the specified persistence period is defined as a number of received data records.

15. The method as recited in claim 8, wherein the set of monitoring data records is received from the remote device in an arbitrary chronological manner.

16. The method as recited in claim 8, wherein processing the monitoring data records in the database is performed using a structured query language script.

17. The method as recited in claim 8, wherein each data record in the set of monitoring data records includes respective status values for multiple monitored conditions.

18. The method as recited in claim 17, wherein processing of the monitoring data records in the database is performed on one monitored condition at a time, and wherein the multiple monitored conditions are processed in a sequential manner.

* * * * *